US009109121B2

(12) United States Patent
Kalyankar et al.

(10) Patent No.: US 9,109,121 B2
(45) Date of Patent: Aug. 18, 2015

(54) SOL-GEL BASED ANTIREFLECTIVE COATINGS USING ALKYLTRIALKOXYSILANE BINDERS HAVING LOW REFRACTIVE INDEX AND HIGH DURABILITY

(75) Inventors: Nikhil D. Kalyankar, Hayward, CA (US); Zhi-Wen Sun, San Jose, CA (US); Jeroen Van Duren, Palo Alto, CA (US); Mark Lewis, Ypsilanti, MI (US); Liang Liang, Taylor, MI (US)

(73) Assignees: Intermolecular, Inc., San Jose, CA (US); Guardian Industries Corporation, Auburn Hills, MI (US)

( * ) Notice: Subject to any disclaimer, the term of this patent is extended or adjusted under 35 U.S.C. 154(b) by 669 days.

(21) Appl. No.: 13/273,007

(22) Filed: Oct. 13, 2011

(65) Prior Publication Data
US 2013/0095237 A1    Apr. 18, 2013

(51) Int. Cl.
| C03C 17/00 | (2006.01) |
| C03C 17/22 | (2006.01) |
| C03C 17/30 | (2006.01) |
| C09D 1/00 | (2006.01) |
| C09D 5/00 | (2006.01) |
| C09D 7/12 | (2006.01) |
| G02B 1/115 | (2015.01) |
| C08K 3/36 | (2006.01) |

(52) U.S. Cl.
CPC ............. *C09D 1/00* (2013.01); *C03C 17/008* (2013.01); *C09D 5/006* (2013.01); *C09D 7/1216* (2013.01); *C09D 7/1266* (2013.01); *G02B 1/115* (2013.01); *C03C 17/22* (2013.01); *C03C 17/30* (2013.01); *C08K 3/36* (2013.01)

(58) Field of Classification Search
CPC ....... C03C 17/30; C03C 17/22; C03C 17/006; C03C 17/007; C03C 17/008
USPC ........................................................ 427/162
See application file for complete search history.

(56) References Cited

U.S. PATENT DOCUMENTS

| 5,755,867 A * | 5/1998 | Chikuni et al. .......... 106/287.16 |
| 6,482,525 B1 * | 11/2002 | Kasemann et al. ............ 428/447 |
| 2005/0266208 A1 * | 12/2005 | Raychaudhuri et al. ...... 428/143 |

(Continued)

OTHER PUBLICATIONS

Tan, B., et al.; Study of the Effects of Progressive Changes in Alkoxysilane Structure on SolGel Reactivity; Oct. 19, 2006; Academia—UniVersity of Kentucky; J. Physc. Chem B pp. 2235322364.

(Continued)

*Primary Examiner* — James M Mellott

(57) ABSTRACT

Methods and compositions for forming porous low refractive index coatings on substrates are provided. The method comprises coating a substrate with a sol-formulation comprising silica based nanoparticles and an alkyltrialkoxysilane based binder. Use of the alkyltrialkoxysilane based binder results in a porous low refractive index coating having bimodal pore distribution including mesopores formed from particle packing and micropores formed from the burning off of organics including the alkyl chain covalently bonded to the silicon. The mass ratio of binder to particles may vary from 0.1 to 20. Porous coatings formed according to the embodiments described herein demonstrate good optical properties (e.g. a low refractive index) while maintaining good mechanical durability due to the presence of a high amount of binder and a close pore structure.

15 Claims, 3 Drawing Sheets

(56) References Cited

U.S. PATENT DOCUMENTS

| | | |
|---|---|---|
| 2010/0165467 A1 | 7/2010 | Thies |
| 2011/0008236 A1 | 1/2011 | Hinman |
| 2011/0151260 A1* | 6/2011 | Okubo et al. ............... 428/402 |
| 2011/0201735 A1* | 8/2011 | Arpac et al. ............... 524/261 |

OTHER PUBLICATIONS

Brochier Salon, M. et al.; Competition Between Hydrolysis and Condensation Reactions of Trialkoxysilanes as a Funtion of the Amount of Water and the Nature of the Organic Group; Jan. 1, 2010; Academia—Grenoble Institute of Technology, France; Colloids and Surfaces a Physiicochemical and Engineering Aspects pp. 147154.

Terleczky, P., et al.; The Effect of the Primary Solvate Shell on the Mechanism of the Stober Silica Synthesis. A Density Functional Investigation; Jan. 7, 2009; University—Budapest UniVersity of Technology and Economics; J. Phys. Chem. A. pp. 10961104.

Prabhakaran, K., et al.; Ultrafine Luminescent Structures Through Nanoparticle SelfAssembly; Jul. 6, 2006; Institute of Physics Publishing; Nanotechnology pp. 38023805.

Alemi, A., et al.; Preparation Characterization and Luminescent Properties of Europium Oxide Doped Nano LaMn0.9 by SolGel Processing; Dec. 1, 2008; University of Tabriz, Iran; Bull. Mater. Sci. vol. 31 No. 7 pp. 967973.

Flores-Gonzalez, M.A., et al.; Eu3 Addition Effect on the Stability and Crystallinity of Fiber Single Crystal and NonStructured Y2O3 Oxide; Feb. 11, 2005; Academia—Lyon1 University, France; Journal of Crystal Growth pp. 502508.

Bazzi, R., et al.; Synthesis adn Luminescent Properties of Sub5nm Lanthanide Oxides Nanoparticles; Jan. 1, 2003; Academia—Lyon1 University, France; Journal of Luminescence pp. 445450.

Hoss, P., et al.; Synthesis Crystal Structures and Luminescence Properties of the Eu3 doped Yttrium OxotelluratesIV Y2Te4O11 and Y2Te5O13; Jan. 1, 2008; Academia—Universitat Stuttgart; Journal of Solid State Chemistry pp. 27832788.

* cited by examiner

SOL-GEL BASED ANTIREFLECTIVE COATINGS USING ALKYLTRIALKOXYSILANE BINDERS HAVING LOW REFRACTIVE INDEX AND HIGH DURABILITY

BACKGROUND OF THE INVENTION

1. Field of the Invention

Embodiments of the invention relate generally to methods and compositions for forming porous low refractive index (RI) coatings on substrates.

2. Description of the Related Art

Coatings that provide low reflectivity or a high percent transmission over a broad wavelength range of light are desirable in many applications including semiconductor device manufacturing, solar cell manufacturing, glass manufacturing, and energy cell manufacturing. The transmission of light through a material causes the wavelength of the light to change, a process known as refraction, while the frequency remains unchanged thus changing the speed of light in the material. The refractive index of a material is a measure of the speed of light in that material which is generally expressed as a ratio of the speed of light in vacuum relative to that in the material. Low reflectivity coatings generally have an optimized refractive index (n) in between air (n=1) and glass (n~1.5).

An antireflective (AR) coating is a type of low reflectivity coating applied to the surface of a transparent article to reduce reflectance of visible light from the article and enhance the transmission of such light into or through the article thus decreasing the refractive index. One method for decreasing the refractive index and enhancing the transmission of light through an AR coating is to increase the porosity of the antireflective coating. Porosity is a measure of the void spaces in a material. Although such antireflective coatings have been generally effective in providing reduced reflectivity over the visible spectrum, the coatings have suffered from deficiencies when used in certain applications. For example, it is often difficult to control pore size and shape. Further, porous AR coatings which are used in solar applications are highly susceptible to moisture absorption. Moisture absorption may lead to an increase in refractive index of the AR coating and corresponding reduction in light transmission.

Thus, there is a need for low refractive index AR coatings which exhibit increased durability and controllable pore size.

SUMMARY OF THE INVENTION

Embodiments of the invention relate generally to methods and compositions for forming porous low refractive index coatings on substrates. In one embodiment a method of forming a porous coating on a substrate is provided. The method comprises coating a substrate with a sol-formulation comprising an alkyltrialkoxysilane-based binder having the formula:

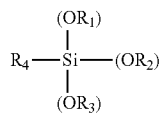

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms, wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms, and silica based nanoparticles, wherein a mass ratio of the alkyltrialkoxysilane-based binder to the silica based nanoparticles is between 0.1:1 to 20:1, and annealing the coated substrate.

In another embodiment, a sol-formulation for forming a sol-gel is provided. The sol-formulation comprises an alcohol containing solvent, an acid or base containing catalyst, an alkyltrialkoxysilane-based binder having the formula:

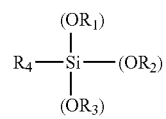

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms, wherein $R_4$ represents an alkyl group containing 1 to 20 carbon atoms, an aryl group containing 6 to 20 carbon atoms, or aralkyl group containing 7 to 20 carbon atoms, or a fluoro-modified alkyl group containing 1 to 20 carbon atoms, and silica based nanoparticles, wherein a mass ratio of the alkyltrialkoxysilane-based binder to the silica based nanoparticles is between 0.1:1 to 20:1.

In yet another embodiment, a method of making a sol-gel is provided. The method comprises forming a sol-formulation comprising an alkyltrialkoxysilane-based binder having the formula:

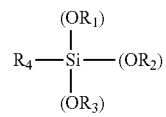

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms, wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms, and silica based nanoparticles; wherein a mass ratio of the alkyltrialkoxysilane-based binder to the silica based nanoparticles is between 0.1:1 to 20:1, an acid or base containing catalyst, and an alcohol containing solvent.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
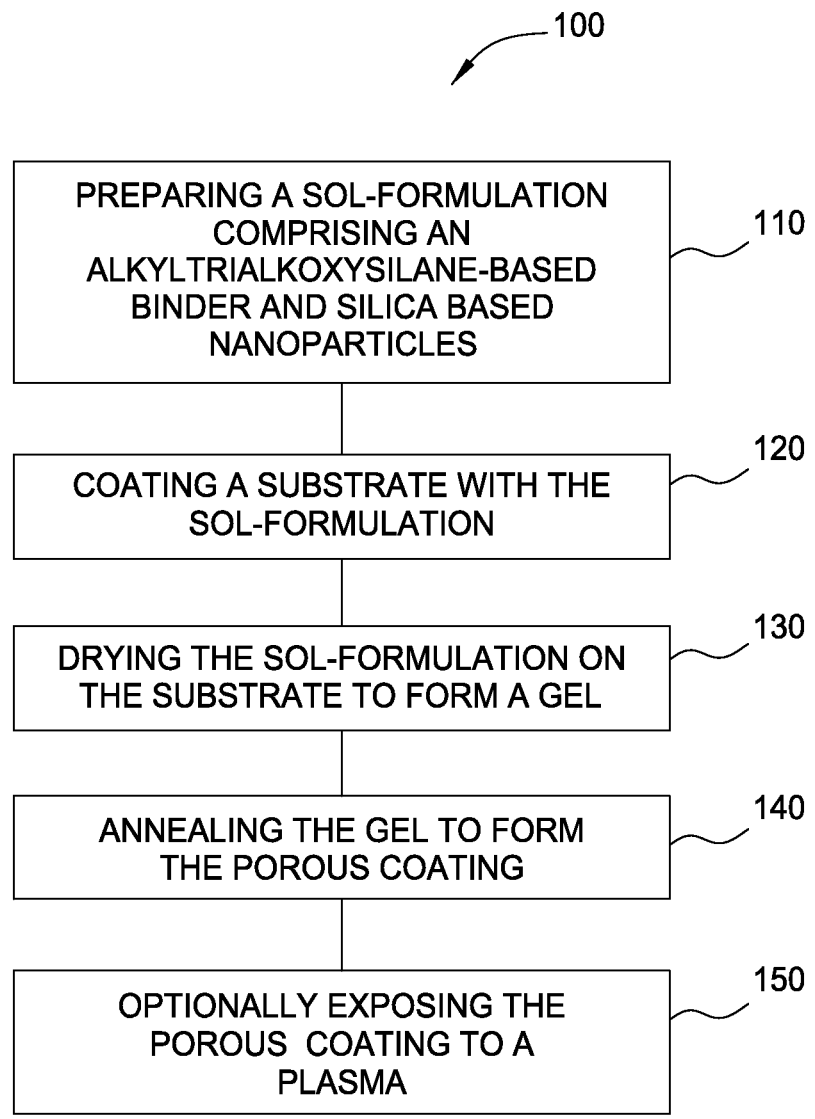
FIG. 1 is a flow chart of one embodiment of a method for forming a low refractive index porous coating on a substrate according to embodiments described herein.

Embodiments of the invention relate generally to methods and compositions for forming porous low refractive index coatings on substrates. More specifically, embodiments of the invention relate generally to sol-gel processes and sol formulations for forming low refractive index coatings on substrates.

The term "binder" as used herein refers to a component used to bind together one or more types of materials in mixtures. The principal properties of a binder are adhesion and cohesion.

The term "porosity" as used herein is a measure of the void spaces in a material, and may be expressed as a fraction, the "pore fraction" of the volume of voids over the total volume, between 0 and 1, or as a percentage between 0 to 100%.

The term "micropore" as used herein refers to a pore having a diameter of less than 2 nanometers.

The term "mesopore" as used herein may have a diameter between 2 nanometers and 50 nanometers.

The term "macropore" as used herein may have diameter greater than 50 nanometers.

The term "sol-formulation" as used herein is a chemical solution comprising at least an alkyltrialkoxysilane-based binder and silica based nanoparticles.

The term "sol-gel process" as used herein is a process where a wet formulation (the "sol") is dried to form a gel coating having both liquid and solid characteristics. The gel coating is then heat treated to form a solid material. This technique is valuable for the development of coatings because it is easy to implement and provides films of uniform composition and thickness.

The term "sol-gel transition point" as used herein refers to the point of transition of a sol to a gel.

The term "solidifier" as used herein refers to any chemical compound that expedites the occurrence of the sol-gel transition point. It is believed that the solidifier increases the viscosity of the sol to form a gel.

The term "surfactant" as used herein is a compound that lowers the surface tension of a liquid and contains both hydrophobic groups and hydrophilic groups. Thus the surfactant contains both a water insoluble component and a water soluble component. The surfactant may also be used to stabilize colloidal sols to reduce the precipitation of solids over extended periods of storage.

The term "total ash content" as used herein refers to the amount of inorganic components remaining after combustion of the organic matter in the sol formulation by subjecting the sol formulation to high temperatures. Exemplary inorganic materials remaining after combustion of the organic matter for a sol-formulation described herein typically include silica from particles and silica from binder. However, other inorganic materials, for example, fluorine, may also be present in the total ash content after combustion. The "total ash content" is typically obtained by the following method:

1. Exposing a known quantity of a sol formulation to high temperatures greater than 600 degrees Celsius to combust the organic matter.

2. Weighing the leftover inorganic material (referred to as "ash").

The total ash content is calculated from the following formula: total ash content (wt. %) of the sol formulation= (Weight of ash (g)/original weight of the sol formulation (g))×100.

The term "binder ash percent contribution" refers to the percentage of ash in the total ash content coming from binder. The binder levels specified herein are typically described in terms of "equivalent weight of silica" contribution to total ash content of the formulation. For example, a 70% binder ash contribution would mean 70% of the total ash content in the formulation comes from the alkyltrialkoxysilane-based binder and 30% of the total ash content comes from silica based nanoparticles.

Certain embodiments described herein relate to a wet chemical film deposition process using a specific sol-formulation including at least one alkyltrialkoxysilane-based binder and silica based nanoparticles to produce porous anti-reflective coatings with a low refractive index (e.g., lower than glass).

Figure 2:
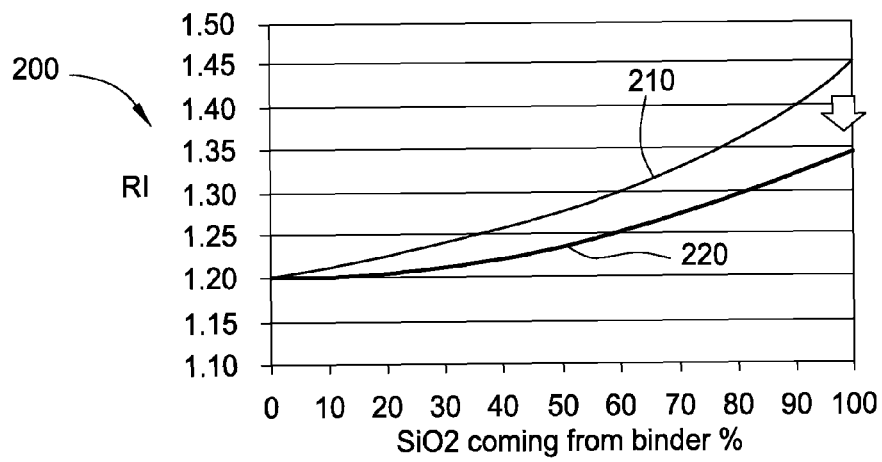
FIG. 2 is a plot depicting % contribution of silica from binder verses the refractive index for porous coatings.

FIG. 2 is a plot 200 depicting % contribution of silica from binder verses the refractive index (RI) for porous coatings. The x-axis represents the % silica contribution from binder and the y-axis represents the refractive index of the resulting porous coating. Curve 210 is a control that shows the typical RI trend as a function of increasing binder ash % contribution for porous coating formed using known binders that do not have an additional alkyl group (e.g., tetraethylorthosilicate). Curve 220 shows the RI trend as a function of increasing binder ash % contribution for porous coatings formed using the alkyltrialkoxysilane based binders described herein. As shown by curve 210, an increase in the binder present in a sol-formulation typically leads to a reduction in pore fraction and a corresponding increase in the refractive index of the resulting anti-reflective coating. As shown by curve 220, the alkyl chain of the alkyltrialkoxysilane-based binders described herein lead to the formation of a bimodal pore system within the resulting porous antireflective coating. The packing of the silica-based particles leads to formation of mesopores within the porous film and combustion of the alkyl chain leads to the formation of micropores within the porous film. These two pore formation mechanisms provide for further reduction in refractive index values without significantly affecting the durability of the anti-reflective coating. The resulting porous anti-reflective coatings may also exhibit high durability and a closed pore structure.

The low refractive index porous coatings formed by sol-gel processes described herein may be further developed using combinatorial methods of optimizing the sol-formulations and conditions used to create those coatings. Combinatorial methods may include any processing that varies the processing conditions in two or more substrates or regions of a substrate. The combinatorial methodology includes multiple levels of screening to select coatings for further variation and optimization. Exemplary combinatorial methods and apparatus are described in co-pending U.S. patent application Ser.

No. 12/970,638, filed Dec. 16, 2010 and titled HIGH-THROUGHPUT COMBINATORIAL DIP-COATING APPARATUS AND METHODOLOGIES.

FIG. 1 is a flow chart of one embodiment of a method 100 for forming a low refractive index porous coating on a substrate according to embodiments described herein. At block 110, a sol-formulation comprising an alkyltrialkoxysilane-based binder and silica based nanoparticles is prepared.

In one embodiment, the sol-formulation may be prepared by mixing the alkyltrialkoxysilane-based binder, silica based nanoparticles, an acid or base containing catalyst, water, and a solvent system. The sol-formulation may be formed by at least one of a hydrolysis and polycondensation reaction. The sol-formulation may be stirred at room temperature or at an elevated temperature (e.g., 50-60 degrees Celsius) until the sol-formulation is substantially in equilibrium (e.g., for a period of 24 hours). The sol-formulation may then be cooled and additional solvents added to either reduce or increase the ash content if desired.

The alkyltrialkoxysilane-based binder may be represented by the general formula (I) shown below:

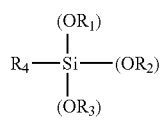

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms and when there are a plurality of $R_1$, $R_2$, or $R_3$ groups, they may be the same or different; and wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms.

Exemplary alkyl groups containing 1 to 20 carbon atoms may be selected from the group consisting of: n-butyl, isobutyl, n-pentyl, isopentyl, n-hexyl, isohexyl, cyclohexyl, n-heptyl, methoylcyclohexyl, octyl, ethylcyclohexyl, and the like.

Exemplary aryl groups containing 6 to 20 carbon atoms may be selected from the group consisting of: phenyl, benzyl, xylyl, and the like.

Exemplary fluoro-modified alkyl groups containing 1 to 20 carbon atoms may be selected from the group consisting of: fluoromethyl, fluoroethyl, fluorohexyl, and the like.

Exemplary alkyltrialkoxysilane-based binders may be selected from the group consisting of n-propyltriethoxysilane, n-pentyltriethoxysilane, n-hexyltriethoxysilane, cyclohexyltrimethoxysilane, 3-(heptafluoroisopropoxy)propylmethoxysilane, Octyltrimethoxysilane, 1,2-Ethylenebis(trimethoxysilane), 1,6-Bis(trimethoxysilyl)hexane, Cyclooctyltrimethoxysilane, (Cyclopentenyloxy)trimethylsilane, N-cyclohexylaminopropyltrimethoxysilane, N-octadecyltrimethoxysilane, Dodecyltrimethoxysilane, Isooctyltrimethoxysilane, 3-chloropropyltrimethoxysilane, Acetoxymethyltrimethoxysilane, 3-cyanopropyltrimethoxysilane, [(Bucycloheptenyl)ethyl]trimethoxysilane, 3-isocyanotopropyltrimethoxysilane, 3-Mercaptopropylmethyldimethoxysilane, 3-aminopropyltriethoxysilane Allyltrimethoxysilane, 2-Ferrocenylethyltriethoxysilane, methyltriethoxysilane (MTES), methyltrimethoxysilane (MTMS), glycidoxipropyltrimethoxysilane (Glymo), N-butyltrimethoxysilane, aminoethyltrimethoxysilane, trimethoxysilane, triethoxysilane, vinyltrimethoxysilane, propyltriethoxysilane (PTES), ethyltriethoxysilane (ETES), n-butyltriethoxysilane (BTES), methylpropoxysilane, and combinations thereof.

In certain embodiments, the alkyltrialkoxysilane-based binder may be used with other binders. Other exemplary binders that may be used with the alkyltrialkoxysilane-based binders described herein include orthosilicate-based binders. Exemplary orthosilicate-based binders may be selected from the group consisting of tetraethylorthosilicate (TEOS), tetramethylorthosilicate, (TMOS), tetrapropylorthosilicate, tetrabutylorthosilicate, tetrakis(trimethylsilyloxy)silane, tetrapropylorthosilicate (TPOS), propyltriethylorthosilicate (PTES), and combinations thereof.

The amount of alkyltrialkoxysilane-based binder in the sol-formulation may comprise at least 0.1 wt. %, 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % of the total weight of the sol-formulation. The amount of alkyltrialkoxysilane-based binder in the sol-formulation may comprise up to 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % or 50 wt. % of the total weight of the sol-formulation. The amount of the alkyltrialkoxysilane-based binder in the sol-formulation may be present in the sol-formulation in an amount between about 0.1 wt. % and about 50 wt. % of the total weight of the sol-formulation. The amount of the alkyltrialkoxysilane-based binder in the sol-formulation may be present in the sol-formulation in an amount between about 5 wt. % and about 12 wt. % of the total weight of the sol-formulation.

The total ash content of the sol-formulation may vary from 0.05% to 20% by mass of the sol-formulation. The total ash content of the sol-formulation may comprise at least 0.05%, 1%, 3%, 4%, 5%, 7%, 9%, 11%, 13%, 15%, 17%, or 19% by mass of the sol-formulation. The total ash content of the sol-formulation may comprise up to 0.05%, 1%, 3%, 4%, 5%, 7%, 9%, 11%, 13%, 15%, 17%, 19%, or 20% by mass of the sol-formulation.

The ash percent contribution of the alkyltrialkoxysilane-based binder to the total ash content in the sol-formulation may comprise at least 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, or 75 wt. % of the total ash content of the sol-formulation. The ash percent contribution of the alkyltrialkoxysilane-based binder in the sol-formulation may comprise up to 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, or 80 wt. % of the total ash content in the sol-formulation. The ash percent contribution of the alkyltrialkoxysilane-based binder to the total ash content in the sol-formulation may be present in an amount between about 10 wt. % and about 80 wt. % of the total ash content in the sol-formulation. The ash percent contribution of alkyltrialkoxysilane-based binder to the total ash content in the sol-formulation may be present in the sol-formulation in an amount between about 60 wt. % and about 70 wt. % of the total ash content in the sol-formulation.

The silica based nanoparticles may be spherical or non-spherical (e.g., elongated, pearl-shaped, or disc-shaped). The silica based nanoparticles include silica based nanoparticles with at least one dimension between 10 and 200 nanometers. The silica based nanoparticles may be selected from spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof.

The silica based nanoparticles may be colloidal silica mono-dispersed in an organic solvent. Exemplary organic solvents include N,N-Dimethyl acetamide, ethylene glycol, isopropanol, methanol, methyl ethyl ketone, methyl isobutyl ketone, and methanol. The amount of silica based nanoparticles present in the organic solvent may comprise between 15 wt. % and 45 wt. % of the total colloidal silica in organic solvent system. The colloidal silica in organic solvent system may comprise less than 3.0% water. The colloidal silica in organic solvent may have a viscosity less than 100 mPa·s. The colloidal silica in organic solvent may have a pH from about 2 to about 6.

Exemplary silica based nanoparticles are available from Nissan Chemical America Corporation under the tradename ORGANOSILICASOL™. Suitable commercially available products of that type include ORGANOSILICASOL™ IPA-ST silica particles (particle size of 10-15 nm, 30-31 wt. % of $SiO_2$), ORGANOSILICASOL™ IPA-ST-L silica particles (particle size of 40-50 nm, 30-31 wt. % of $SiO_2$), ORGANOSILICASOL™ IPA-ST-MS silica particles (particle size of 17-23 nm, 30-31 wt. % of $SiO_2$), ORGANOSILICASOL™ IPA-ST-UP silica particles (particles have a diameter of 9-15 nm with a length of 40-100 nm, 15-16 wt. % of $SiO_2$), and ORGANOSILICASOL™ IPA-ST-ZL silica particles (particle size of 70-100 nm, 30-31 wt. % of SiO2).

Other exemplary silica based nanoparticles are available from Nissan Chemical America Corporation under the tradename SNOWTEX® colloidal silica. Suitable commercially available products of that type include SNOWTEX® ST-20L colloidal silica (particle size of 40-50 nm, 20-21 wt. % of $SiO_2$), SNOWTEX® ST-40 colloidal silica (particle size of 10-20 nm, 40-41 wt. % of $SiO_2$), SNOWTEX® ST-50 colloidal silica (particle size of 20-30 nm, 47-49 wt. % of $SiO_2$), SNOWTEX® ST-C colloidal silica (particle size of 10-20 nm, 20-21 wt. % of $SiO_2$), SNOWTEX® ST-N colloidal silica (particle size of 10-20 nm, 20-21 wt. % of $SiO_2$), SNOWTEX® ST-0 colloidal silica (particle size of 10-20 nm, 20-21 wt. % of $SiO_2$), SNOWTEX® ST-OL colloidal silica (particle size of 40-50 nm, 20-21 wt. % of $SiO_2$), SNOWTEX® ST-ZL colloidal silica (particle size of 70-100 nm, 40-41 wt. % of $SiO_2$), SNOWTEX® ST-PS-M colloidal silica (particle size of 18-25 nm/80-150 nm, <0.2 wt. % of $SiO_2$), SNOWTEX® ST-PS-MO colloidal silica (particle size of 18-25 nm/80-150 nm, 18-19 wt. % of $SiO_2$), SNOWTEX® ST-PS-S colloidal silica (particle size of 10-15 nm/80-120 nm, 15-16 wt. % of $SiO_2$), SNOWTEX® ST-PS-O colloidal silica (particle size of 10-15 nm/80-120 nm, 15-16 wt. % of $SiO_2$), SNOWTEX® ST-OUP colloidal silica (particle size of 9-15 nm/40-100, 15-16 wt. % of $SiO_2$), and SNOWTEX® ST-UP colloidal silica (particle size of 9-15 nm/40-100 nm, <0.2 wt. % of $SiO_2$).

Other exemplary silica based nanoparticles are available from Nippon Shokubai Co. Ltd. under the tradename SEAHOSTAR® spherical silica particles. Suitable commercially available products of that type include SEAHOSTAR® type KE amorphous silica particles such as: SEAHOSTAR® type KE-E10 amorphous silica particles (average particle size of 0.10 μm-0.16 μm), SEAHOSTAR® type KE-W10 amorphous silica particles (average particle size of 0.09 μm-0.15 μm), and SEAHOSTAR® type KE-P10 amorphous silica particles (average particle size of 0.08 μm-0.14 μm), Other exemplary silica-based nanoparticles are available from Purest Colloids, Inc. under the tradename MesoSilica™ nanoparticle colloidal silica (average particle size of 6 nm) and from Rockwood Additives Ltd. under the tradename LAPONITE® silica particles.

The amount of silica based nanoparticles in the sol-formulation may comprise at least 0.01 wt. %, 0.05 wt. %, 1 wt. %, 1.5 wt. %, 2 wt. %, 2.5 wt. %, 3 wt. %, 3.5 wt. %, 5 wt. %, 7 wt. %, 9 wt. %, 11 wt. %, or 13 wt. % of the total weight of the sol-formulation. The amount of silica based nanoparticles in the sol-formulation may comprise up to 0.05 wt. %, 1 wt. %, 1.5 wt. %, 2 wt. %, 2.5 wt. %, 3 wt. %, 3.5 wt. %, 5 wt. %, 7 wt. %, 9 wt. %, 11 wt. %, 13 wt. %, or 15 wt. % of the total weight of the sol-formulation. The amount of the silica based nanoparticles in the sol-formulation may be present in the sol-formulation in an amount between about 0.01 wt. % and about 15 wt. % of the total weight of the sol-formulation. The amount of the silica based nanoparticles in the sol-formulation may be present in the sol-formulation in an amount between about 1.5 wt. % and about 3.5 wt. % of the total weight of the sol-formulation.

The ash percent contribution of the silica based nanoparticles to the total ash content in the sol-formulation may comprise at least 25 wt. %, 30 wt. %, 35 wt. %, 40 wt. %, 45 wt. %, 50 wt. %, 55 wt. %, 60 wt. %, or 65 wt. % of the total ash content of the sol-formulation. The ash percent contribution of silica based nanoparticles in the sol-formulation may comprise up to 30 wt. %, 35 wt. %, 40 wt. %, 45 wt. %, 50 wt. %, 55 wt. %, 60 wt. %, 65 wt. %, or 70 wt. % of the total ash content of the sol-formulation. The ash percent contribution of silica based nanoparticles in the sol-formulation may be present in an amount between about 25 wt. % and about 70 wt. % of the total ash content of the sol-formulation. The ash percent contribution of silica based nanoparticles in the sol-formulation may be present in an amount between about 30 wt. % and about 40 wt. % of the total ash content of the sol-formulation.

A mass ratio of the alkyltrialkoxysilane-based binder to silica based nanoparticles may be between 60:40 and 90:10. Exemplary ratios of the alkyltrialkoxysilane-based binder to the silica based nanoparticles include 60:40, 70:30, 80:20, 85:15, and 90:10.

The sol-formulation may further include rare-earth-based oxide nanoparticles. Exemplary rare-earth-based oxide nanoparticles include $Y_2TeO_{11}$, $Y_2Te_5O_{13}$, $YInGe_2O_7$:$Eu^{3+}$, yttrium aluminum garnet (YAG) doped with $Eu^{3+}$ ions, $La_{(1-x)}Eu_xMn_{0-9}Zn_{0-1}O_{3+d}$ (LEMZ), $Y_2O_3$:$Eu^{3+}$ particles of less than 5 nm in size, and sub-5 nm lanthanide oxide nano particles. The rare-earth-based oxide nanoparticles may be spherical or non-spherical (e.g., elongated, pearl-shaped, or disc-shaped). The rare-earth-based oxide nanoparticles include rare-earth-based oxide nanoparticles with at least one dimension between 1 and 50 nanometers.

The amount of rare-earth-based oxide nanoparticles in the sol-formulation may comprise at least 0.01 wt. %, 0.1 wt. %, 1 wt. %, 3 wt. %, or 4 wt. % of the total weight of the sol-formulation. The amount of rare-earth-based oxide nanoparticles in the sol-formulation may comprise up to 0.1 wt. %, 1 wt. %, 3 wt. %, 4 wt. %, or 5 wt. % of the total weight of the sol-formulation.

It should be understood that although discussed as being used with the alkyltrialkoxysilane-binders described herein, the rare-earth based nanoparticles may be used with other particle-binder systems comprising other silane-based binders and are not limited to embodiments comprising the alkyltrialkoxysilane-binders described herein. Exemplary silanes include tetraethylorthosilicates (TEOS), vinyl silanes, methacryloxysilanes, epoxy-silanes, and combinations thereof. One exemplary particle-binder system would include the rare-earth based oxide nanoparticles, a silane-based binder, silica nanoparticles, an alcohol containing solvent, and an acid or base catalyst.

Combining silica-based nanoparticles with rare-earth-based oxide nanoparticles provides both a reduction in reflection and more efficient use of high energy photons (UV) in photovoltaic systems. In addition, when rare-earth-based oxide nanoparticles are combined with silanes and high-temperature curing, the coating can be made more durable and less sensitive to yellowing.

The sol-formulation may further include an acid or base catalyst for controlling the rates of hydrolysis and condensation. The acid or base catalyst may be an inorganic or organic acid or base catalyst. Exemplary acid catalysts may be selected from the group consisting of hydrochloric acid (HCl), nitric acid ($HNO_3$), sulfuric acid ($H_2SO_4$), acetic acid ($CH_3COOH$), phosphoric acid ($H_3PO_4$), citric acid, and combinations thereof. Exemplary base catalysts include tetramethylammonium hydroxide (TMAH), sodium hydroxide (NaOH), potassium hydroxide (KOH, and the like.

The acid catalyst level may be 0.001 to 10 times in stoichiometric amount compared with the alkyltrialkoxysilane-based binder. The acid catalyst level may be from 0.001 wt. % to 0.1 wt. % of the total weight of the sol-formulation. The base catalyst level may be from 0.001 to 10 times molar binder (the alkyltrialkoxysilane-based binder). The base catalyst level may be from 0.001 wt. % to 0.1 wt. % of the total weight of the sol-formulation.

The sol-formulation further includes a solvent system. The solvent system may include a non-polar solvent, a polar aprotic solvent, a polar protic solvent, and combinations thereof. Selection of the solvent system and the porosity forming agent may be used to influence the formation and size of pores. Exemplary solvents include alcohols, for example, n-butanol, isopropanol, n-propanol, ethanol, methanol, and other well known alcohols.

The amount of solvent in the sol-formulation may comprise at least 50 wt. %, 55 wt. %, 60 wt. %, 65 wt. %, 70 wt. %, 75 wt. %, 80 wt. %, 85 wt. %, or 90 wt. % of the total weight of the sol-formulation. The amount of solvent in the sol-formulation may comprise up to 55 wt. %, 60 wt. %, 65 wt. %, 70 wt. %, 75 wt. %, 80 wt. %, 85 wt. %, 90 wt. %, or 95 wt. % of the total weight of the sol-formulation. The amount of solvent may be from 50 wt. % to 95 wt. % of the total weight of the sol-formulation. The amount of solvent may be from 80 wt. % to 95 wt. % of the total weight of the sol-formulation.

The solvent system may further include water. Water may be present in 0.5 to 10 times in stoichiometric amount compared with the alkyltrialkoxysilane-based binder. Water may be present from 0.001 to 0.1 wt. % of the total weight of sol-formulation.

The sol-formulation may further include a surfactant. In certain embodiments, the surfactant may be used for stabilizing the sol-gel composition. In certain embodiments, the surfactant may be used as a molecular porogen which is used as a porosity forming agent. The surfactant may be selected from the group comprising: non-ionic surfactants, cationic surfactants, anionic surfactants, and combinations thereof. Exemplary non-ionic surfactants include non-ionic surfactants with linear hydrocarbon chains and non-ionic surfactants with hydrophobic trisiloxane groups. The surfactant may be a trisiloxane surfactant. Exemplary molecular porogens may be selected from the group consisting of: polyoxyethylene stearyl ether, benzoalkoniumchloride (BAC), cetyltrimethylammoniumbromide (CTAB), 3-glycidoxypropyltrimethoxysilane, polyethyleneglycol (PEG), ammonium lauryl sulfate (ALS), dodecyltrimethylammoniumchloride (DTAC), polyalkyleneoxide modified hepta-methyltrisiloxane, and combinations thereof.

Exemplary surfactants are commercially available from Momentive Performance Materials under the tradename SILWET® surfactant and from SIGMA ALDRICH® under the tradename BRIJ® surfactant. Suitable commercially available products of that type include SILWET® L-77 surfactant and BRIJ® 78 surfactant.

In certain embodiments, where the surfactant is used as a stabilizer, the surfactant may be present in the sol-formulation in an amount between about 0.0001% and about 0.003 wt. % of the total weight of the sol-formulation.

In certain embodiments, where the surfactant is used as a molecular porogen, the molecular porogen may be present in the sol-formulation in an amount between about 0.1 and about 5 wt. % of the total weight of the sol-formulation.

The sol-formulation may further include a gelling agent or "solidifier". The "solidifier" may be used to expedite the occurrence of the sol-gel transition point. It is believed that the solidifier increases the viscosity of the sol to form a gel.

The solidifier may be selected from the group comprising: gelatin, polymers, silica gel, emulsifiers, organometallic complexes, charge neutralizers, cellulose derivatives, and combinations thereof.

Gelatin is generally a translucent, colorless, brittle solid derived from the hydrolysis of collagen by boiling skin, ligaments and tendons. Exemplary gelatins are commercially available from SIGMA-ALDRICH®.

The polymers may be selected from the group comprising: sodium acrylate, sodium acryloyldimethyl taurate, isohexadecane, polyoxyethylene (80) sorbitan monooleate (commercially available under the tradename TWEEN® 80 from ICI Americas Inc.), polyoxyethylene (20) sorbitan monostearate (commercially available under the tradename TWEEN® 60 from ICI Americas Inc.), laureth-7, C13-14 Isoparaffin, hydroxyethyl acrylate, polyacrylamide, polyvinyl butyral (PVB), squalane, polyalkylene glycols, and combinations thereof. Exemplary polymers are available under the tradenames SIMULGEL® 600, SIMULGEL® EG, SEPIGEL® 305, SIMULGEL® NS, CAPIGEL™ 98, SEPIPLUS™ 265 and SEPIPLUS™ 400 all of which are commercially available from SEPPIC.

Exemplary polyalkylene glycols include polyalkylene glycols where the alkyl group may be any alkyl group, such as, methyl, ethyl, propyl, butyl, pentyl, hexyl, heptyl, octyl, nonyl, decyl, etc. One exemplary polyalkylene glycol includes polyethylene glycol (PEG). Preferable polyethylene glycols have a molecular mass between 200 and 1,000.

Silica gel is a granular, viscous, highly porous form of silica made synthetically from sodium silicate. Exemplary silica gels are commercially available from SIGMA-ALDRICH®.

Exemplary organometallic complexes may comprise a hydrophilic sugar-like head portion and a lipophilic hydrocarbon tail couple by an organometallic fragment (e.g., pentacarbonyl[D-gluco-hex(N-n-octylamino)-1-ylidene]chromium). Other exemplary organometallic complexes include low-molecular mass organic gelator (LMOG).

Exemplary charge neutralizers include ammonium nitrate, sodium chloride, ammonium chloride, and other salts.

Exemplary cellulose derivatives include hydroxypropyl cellulose (HPC), hydroxypropyl methylcellulose (HPMC), nitrocellulose, hydroxypropyl ethylcellulose, hydroxypropyl butylcellulose, hydroxypropyl pentylcellulose, methyl cellulose, ethylcellulose, hydroxyethyl cellulose, various alkyl celluloses and hydroxyalkyl celluloses, various cellulose ethers, cellulose acetate, carboxymethyl cellulose, sodium carboxymethyl cellulose, calcium carboxymethyl cellulose, among others. Exemplary cellulose derivatives are commercially available under the tradenames KLUCEL® hydroxypropylcellulose, METHOCEL™ cellulose ethers, and ETHOCEL™ ethylcellulose polymers.

The at least one solidifier may comprise at least 0.0001 wt. %, 0.001 wt. %, 0.01 wt. %, 0.1 wt. % or 1 wt. % of the sol-formulation. The at least one solidifier may comprise up to 0.01 wt. %, 0.1 wt. %, 1 wt. % or 5 wt. % of the sol-formulation. In certain embodiments, the at least one solidifier may comprise between 0.001 wt. % and 1 wt/% of the sol-formulation. It should be understood that the amount of solidifier added to the sol-gel composition may be based on factors including molecular weight, reactivity, and the number of reactive sites per molecule all of which may vary from molecule to molecule. It is preferable to lower the percent solids at the sol-gel transition point; while at the same time assuring that the solidifier doesn't induce gelation prior to coating in the liquid phase itself.

At block 120, a substrate is coated with the sol-formulation. Exemplary substrates include glass, silicon, metallic coated materials, or plastics. The substrate may be a transparent substrate. The substrate may be flat, curved or any other shape as necessary for the application under consideration. The substrate may be textured or patterned. Exemplary glass substrates include high transmission low iron glass, borosilicate glass (BSG), sodalime glass and standard clear glass. The sol-gel composition may be coated on the substrate using, for example, dip-coating, spin coating, curtain coating, roll coating, capillary coating or a spray coating process. Other application methods known to those skilled in the art may also be used. The substrate may be coated on a single side or on multiple sides of the substrate.

At block 130, the coating on the substrate is dried to form a gel. A gel is a coating that has both liquid and solid characteristics and may exhibit an organized material structure (e.g., a water based gel is JELL-O®). During the drying, the solvent of the sol-formulation is evaporated and further bonds between the components, or precursor molecules, may be formed. The drying may be performed by exposing the coating on the substrate to the atmosphere at room temperature. The coatings (and/or the substrates) may alternatively be exposed to a heated environment at a boiling point above the solvent, low pressure regions, or heated or room temperature air flow to elevate the rate of solvent evaporation. The drying of the coating may not require elevated temperatures, but may vary depending on the composition of the sol-formulation used to form the coating. In one embodiment, the drying temperature may be in the range of approximately 25 degrees Celsius to approximately 200 degrees Celsius. In one embodiment, the drying temperature may be in the range of approximately 50 degrees Celsius to approximately 60 degrees Celsius. The drying process may be performed for a time period of between about 1 minute and 10 minutes, for example, about 6 minutes. Drying temperature and time are dependent on the boiling point of the solvent used during sol formation.

At block 140, the gel is annealed to form the porous coating. The annealing temperature and time may be selected based on the chemical composition of the sol-gel composition, depending on what temperatures may be required to form cross-linking between the components throughout the coating. In one embodiment, the annealing temperature may be in the range of 500 degrees Celsius and 1,000 degrees Celsius. In one embodiment, the annealing temperature may be 600 degrees Celsius or greater. In another embodiment, the annealing temperature may be between 625 degrees Celsius and 650 degrees Celsius. The annealing process may be performed for a time period of between about 3 minutes and 1 hour, for example, about 6 minutes.

The porous coating layer may contain several types of porosity. Exemplary types of porosity include micropores, mesopores, and macropores. The micropores may be formed when organic material is burned off. The micropores typically have a diameter of less than 2 nanometers. The macropores and mesopores may be formed by packing of the silica nanoparticles. The macropores may have a diameter greater than 50 nanometers. The mesopores may have a diameter between 2 nanometers and 50 nanometers. The porous coating may have a pore fraction of between about 0.3 and about 0.6. The porous coating may have a porosity of between about 20% and about 60% as compared to a solid film formed from the same material.

In one embodiment, the coating may be a single coating. In alternate embodiments, the coating may be formed of multiple coatings on the same substrate. In such an embodiment, the coating, gel-formation, and annealing may be repeated to form a multi-layered coating with any number of layers. The multi-layers may form a coating with graded porosity. For example, in certain embodiments it may be desirable to have a coating which has a higher porosity adjacent to air and a lower porosity adjacent to the substrate surface. A graded coating may be achieved by modifying various parameters, such as, the type of porosity forming agent, the anneal time, and the anneal temperature.

At block 150, the porous coating may be exposed to plasma to seal the top layer of the pores to make the film more moisture resistant while preserving the optical properties of the film. The plasma may be RF or DC plasma. In certain embodiments, the pores may be sealed using a molecular masking layer. One exemplary masking layer includes a polymeric layer which may be a few nanometers thick and doesn't significantly impact the overall refractive index of the film. Another exemplary masking layer could be a vacuum deposited metal oxide layer of 2-5 nanometers thickness such as $TiO_2$.

EXAMPLES

It is believed that the following examples further illustrate the objects and advantages of the embodiments. The particular materials and amounts thereof, as well as other conditions and details, recited in these examples should not be used to limit embodiments described herein. Unless stated otherwise all percentages, parts and ratios are by weight. Examples of the invention are numbered while comparative samples, which are not examples of the invention, are designated alphabetically.

Example #1

A sol formulation is prepared using cyclohexyltrimethoxysilane as the alkyltrialkoxysilane-based, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (cyclohexyltrimethoxysilane:IPA-ST-UP particles) is 25:75 ash content contribution. Cyclohexyltrimethoxysilane and silica particles are mixed with water (2 times the molar cyclohexyltrimethoxysilane amount), acetic acid (0.05 times the molar cyclohexyltrimethoxysilane amount) and n-propanol. The solution is stirred for 24 hours at room temperature.

Example #2

A sol formulation is prepared using n-hexyltriethxoysilane as the alkyltrialkoxysilane-based binder, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (n-hexyltriethxoysilane:IPA-ST-UP particles) is 25:75 ash content contribution. N-hexyltriethxoysilane and silica particles are mixed with water (2 times the molar n-hexyltriethxoysilane amount), acetic acid (0.05 times the molar n-hexyltriethxoysilane amount) and n-propanol. The solution is stirred at room temperature and stirred for 24 hours at 60 degrees Celsius.

Example #3

A sol formulation is prepared using cyclohexyltrimethoxysilane as the alkyltrialkoxysilane-based, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (cyclohexyltrimethoxysilane:IPA-ST-UP particles) is 35:65 ash content contribution. Cyclohexyltrimethoxysilane and silica particles are mixed with water (2 times the molar cyclohexyltrimethoxysilane amount), acetic acid (0.5 times the molar cyclohexyltrimethoxysilane amount) and n-propanol. The solution is stirred for 24 hours at room temperature.

Example #4

A sol formulation is prepared using n-hexyltriethxoysilane as the alkyltrialkoxysilane-based binder, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (n-hexyltriethxoysilane:IPA-ST-UP particles) is 50:50 ash content contribution. N-hexyltriethxoysilane and silica particles are mixed with water (2 times the molar n-hexyltriethxoysilane amount), acetic acid (0.5 times the molar n-hexyltriethxoysilane amount) and n-propanol. The solution is stirred at room temperature for 24 hours.

Example #5

A sol formulation is prepared using cyclohexyltrimethoxysilane as the alkyltrialkoxysilane-based, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (cyclohexyltrimethoxysilane:IPA-ST-UP particles) is 35:65 ash content contribution. Cyclohexyltrimethoxysilane and silica particles are mixed with water (2 times the molar cyclohexyltrimethoxysilane amount), acetic acid (0.5 times the molar cyclohexyltrimethoxysilane amount) and n-propanol. The solution is stirred for 24 hours at 60 degrees Celsius.

Example #6

A sol formulation is prepared using n-hexyltriethxoysilane as the alkyltrialkoxysilane-based binder, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (n-hexyltriethxoysilane:IPA-ST-UP particles) is 50:50 ash content contribution. N-hexyltriethxoysilane and silica particles are mixed with water (2 times the molar n-hexyltriethxoysilane amount), acetic acid (0.5 times the molar n-hexyltriethxoysilane amount) and n-propanol. The solution is stirred at 60 degrees Celsius for 24 hours.

Example #7

A sol formulation is prepared using isooctyltrimethoxysilane as the alkyltrialkoxysilane-based binder, n-butanol as the solvent, nitric acid as the catalyst, ORGANOSILICASOL™ IPA-ST-MS spherical silica particles, and water. The total ash content of the solution is 8% (based on equivalent weight of $SiO_2$ produced). The ration of alkyltrialkoxysilane-based binder to silica particles (isooctyltrimethyoxysilane:IPA-ST-MS particles) is 50:50 ash content contribution. Isooctyltrimethoxysilane and silica particles are mixed with water (10 times the molar isooctyltrimethoxysilane amount), nitric acid (0.05 times the molar isooctyltrimethoxysilane amount and n-butanol. The solution is stirred for 24 hours at room temperature.

Example #8

A sol formulation is prepared using a 80:20 molar mixture of n-hexyltriethxoysilane and 3-(heptafluoroisopropoxy)propyltrimethoxysilane as the alkyltrialkoxysilane-based binder, n-propanol as the solvent, acetic acid as the catalyst, ORGANOSILICASOL™ IPA-ST-ZL spherical silica particles, and water. The total ash content of the solution is 6% (based on equivalent weight of $SiO_2$ produced). The ratio of alkyltrialkoxysilane-based binder to silica particles is 50:50 ash content contribution. Silane binder mixture and silica particles are mixed with water (2 times the molar silane binder mixture amount), acetic acid (0.05 times the molar silane binder mixture amount) and n-propanol. The solution is stirred for 24 hours at 60 degrees Celsius.

Example #9

A sol formulation is prepared using 1,6-Bis(trimethoxysilyl)hexane as the alkyltrialkoxysilane-based binder, ethanol as the solvent, hydrochloric acid as the catalyst, ORGANOSILICASOL™ IPA-ST-MS spherical silica particles, and water. The total ash content of the solution is 8% (based on equivalent weight of $SiO_2$ produced). The ratio of alkyltrialkoxysilane-based binder to silica particles (1,6-Bis(trimethoxysilyl)hexane:IPA-ST-MS particles) is 35:65 ash content contribution. 1,6-Bis(trimethoxysilyl)hexane and silica particles are mixed with water (2 times the molar 1,6-Bis(trimethoxysilyl)hexane amount), acetic acid (0.5 times the molar 1,6-Bis(trimethoxysilyl)hexane amount) and ethanol. The solution is stirred for 24 hours at 40 degrees Celsius.

Example #10

A sol formulation is prepared using n-octadecyltrimethoxysilane as the alkyltrialkoxysilane-based binder, ethanol as the solvent, sulfuric acid as the catalyst, ORGANOSILICASOL™ IPA-ST-MS spherical silica particles, and water. The total ash content of the solution is 8% (based on equivalent weight of $SiO_2$ produced). The ratio of alkyltrialkoxysilane-based binder to silica particles (n-octadecyltrimethoxysilane: IPA-ST-MS particles) is 60:40 ash content contribution. N-octadecyltrimethoxysilane and silica particles are mixed with water (2 times the molar n-octadecyltrimethoxysilane amount), sulfuric acid (0.05 times the molar n-octadecyl trimethoxysilane amount) and ethanol. The solution is stirred at room temperature for 24 hours.

Example #11

A sol formulation is prepared using dodecyltrimethoxysilane as the alkyltrialkoxysilane-based binder, n-propanol as the solvent, nitric acid as the catalyst, ORGANOSILICASOL™ IPA-ST-ZL spherical silica particles, and water. The total ash content of the solution is 10% (based on equivalent weight of $SiO_2$ produced). The ratio of alkyltrialkoxysilane-based binder to silica particles dodecyltrimethoxysilane:IPA-ST-ZL particles) is 40:60 ash content contribution. dodecyltrimethoxysilane and silica particles are mixed with water (5 times the molar dodecyltrimethoxysilane amount), nitric acid (0.01 times the molar dodecyltrimethoxysilane amount) and n-propanol. The solution is stirred for 24 hours at 60 degrees Celsius.

Example #12

A sol formulation is prepared using (Cyclopentenyloxy)trimethylsilane as the binder, n-butanol as the solvent, citric acid as the catalyst, ORGANOSILICASOL™ IPA-ST-UP elongated silica particles, and water. The total ash content of the solution is 8% (based on equivalent weight of $SiO_2$ produced). The ratio of binder to silica particles ((Cyclopentenyloxy)trimethylsilane:IPA-ST-UP particles) is 30:70 ash content contribution. (Cyclopentenyloxy)trimethylsilane and silica particles are mixed with water (2 times the molar (Cyclopentenyloxy)trimethylsilane amount), citric acid (0.5 times the molar (Cyclopentenyloxy)trimethylsilane amount) and n-butanol. The solution is stirred at 60 degrees Celsius for 24 hours.

Example #13

A sol formulation is prepared using 1,2-Ethylenebis(trimethoxysilane) as the alkyltrialkoxysilane-based binder, n-propanol as the solvent, sulfuric acid as the catalyst, a mixture of ORGANOSILICASOL™ IPA-ST-UP elongated and IPA-ST-MS spherical silica particles (50:50 mass ratio), and water. The total ash content of the solution is 6% (based on equivalent weight of $SiO_2$ produced). The ratio of alkyltrialkoxysilane-based binder to silica particles (1,2-Ethylenebis(trimethoxysilane):silica particles) is 25:75 ash content contribution. 1,2-Ethylenebis(trimethoxysilane) and silica particles are mixed with water (10 times the molar 1,2-Ethylenebis(trimethoxysilane) amount), acetic acid (0.05 times the molar 1,2-Ethylenebis(trimethoxysilane) amount) and n-propanol. The solution is stirred for 24 hours at room temperature.

Example #14

A sol formulation is prepared using isooctyltrimethoxysilane as the alkyltrialkoxysilane-based binder, ethanol as the solvent, nitric acid as the catalyst, a mixture of ORGANOSILICASOL™ IPA-ST-MS and MesoSilica spherical silica nano particles (60:40 mass ratio), and water. The total ash content of the solution is 8% (based on equivalent weight of SiO2 produced). The ratio of alkyltrialkoxysilane-based binder to silica particles (isooctyltrimethoxysilane:silica particles) is 25:75 ash content contribution. Isooctyltrimethoxysilane and silica particles are mixed with water (4 times the molar n-hexyltriethxoysilane amount), nitric acid (0.05 times the molar Isooctyltrimethoxysilane amount) and ethanol. The solution is stirred for 24 hours at 50 degrees Celsius.

Example #15

A sol formulation is prepared using n-cyclohexylaminopropyltrimethoxysilane as the alkyltrialkoxysilane-based binder, n-propanol as the solvent, hydrochloric acid as the catalyst, ORGANOSILICASOL™ IPA-ST-ZL spherical silica particles, and water. The total ash content of the solution is 6% (based on equivalent weight of $SiO_2$ produced). The ratio of alkyltrialkoxysilane-based binder to silica particles (n-cyclohexylaminopropyltrimethoxysilane:IPA-ST-ZL particles) is 35:65 ash content contribution. N-cyclohexylaminopropyltrimethoxysilane and silica particles are mixed with water (8 times the molar n-cyclohexylaminopropyltrimethoxysilane amount), hydrochloric acid (0.05 times the molar n-cyclohexylaminopropyltrimethoxysilane amount) and n-propanol. The solution is stirred for 24 hours at 50 degrees Celsius.

Example #16

A sol formulation is prepared using dodecyltrimethoxysilane as the alkyltrialkoxysilane-based binder, n-butanol as the solvent, nitric acid as the catalyst, ORGANOSILICASOL™ IPA-ST-MS spherical silica particles, and water. The total ash content of the solution is 8% (based on equivalent weight of $SiO_2$ produced). The ratio of alkyltrialkoxysilane-based binder to silica particles (dodecyltrimethoxysilane:IPA-ST-MS particles) is 70:30 ash content contribution. Dodecyltrimethoxysilane and silica particles are mixed with water (2 times the molar dodecyltrimethoxysilane amount), nitric acid (0.05 times the molar dodecyltrimethoxysilane amount) and n-butanol. The solution is stirred at 40 degrees Celsius for 24 hours.

Example #17

A sol formulation is prepared using isooctyltrimethoxysilane as the alkyltrialkoxysilane-based binder, n-propanol as the solvent, citric acid as the catalyst, ORGANOSILICASOL™ IPA-ST-UP elongated silica particles, and water. The total ash content of the solution is 5% (based on equivalent weight of SiO2 produced). The ratio of alkyltrialkoxysilane-based binder to silica particles (isooctyltrimethoxysilane: IPA-ST-UP particles) is 50:50 ash content contribution. Isooctyltrimethoxysilane and silica particles are mixed with water (5 times the molar isooctyltrimethoxysilane amount), citric acid (5 times the molar isooctyltrimethoxysilane amount) and n-propanol. The solution is stirred for 24 hours at 60 degrees Celsius.

Example #18

A sol formulation is prepared using n-hexyltriethxoysilane as the alkyltrialkoxysilane-based binder, n-propanol as the solvent, acetic acid as the catalyst, ORGANOSILICASOL™ IPA-ST-UP elongated silica particles, $Y_2TeO_{11}$ nanoparticles (20 nm particle size) and water. The total ash content of the solution is 6% (based on equivalent weight of $SiO_2$ produced). The ratio of alkyltrialkoxysilane-based binder to silica particles (n-hexyltriethxoysilane:IPA-ST-UP particles)

is 50:50 ash content contribution. N-hexyltriethxoysilane and silica particles are mixed with water (4 times the molar n-hexyltriethxoysilane amount), acetic acid (0.05 times the molar n-hexyltriethxoysilane amount), $Y_2TeO_{11}$ nano particles at 1:100 mass ratio with silica nano particles and n-propanol. The solution is stirred at 60 degrees Celsius for 24 hours.

Example #19

A sol formulation is prepared using a mixture of dodecyltrimethoxysilane and 3-(heptafluoroisopropoxy)propyltrimethoxysilane (95:5 molar ratio) as the alkyltrialkoxysilane-based binder, n-butanol as the solvent, nitric acid as the catalyst, ORGANOSILICASOL™ IPA-ST-MS spherical silica particles, and water. The total ash content of the solution is 8% (based on equivalent weight of $SiO_2$ produced). The ratio of alkyltrialkoxysilane-based binder to silica particles (silane mixture:IPA-ST-MS particles) is 70:30 ash content contribution. Silane binder and silica particles are mixed with water (2 times the molar silane binder amount), nitric acid (0.05 times the molar silane binder amount) and n-butanol. The solution is stirred at 40 degrees Celsius for 24 hours.

The aforementioned sol formulations may be deposited using either dip (coating speed~0.1-10 mm/sec) or spin coating (100-4,000 rpm) processes on pre-cleaned borosilicate (BSG) or sodalime glass to achieve a film thickness of around 150 nm after annealing. The glass substrate may then be dried at 150 degrees Celsius for 30 minutes in an oven to evaporate all the solvent and then annealed at 625-650 degrees Celsius for 6 minutes. Exemplary refractive index values for AR coatings prepared using the processes described herein are found to be from about 1.18 to about 1.30. The glass substrate may be cooled on a steel slab and characterized to determine the film thickness, refractive index (RI) and improvement in transmittance of light.

Results

Figure 3:
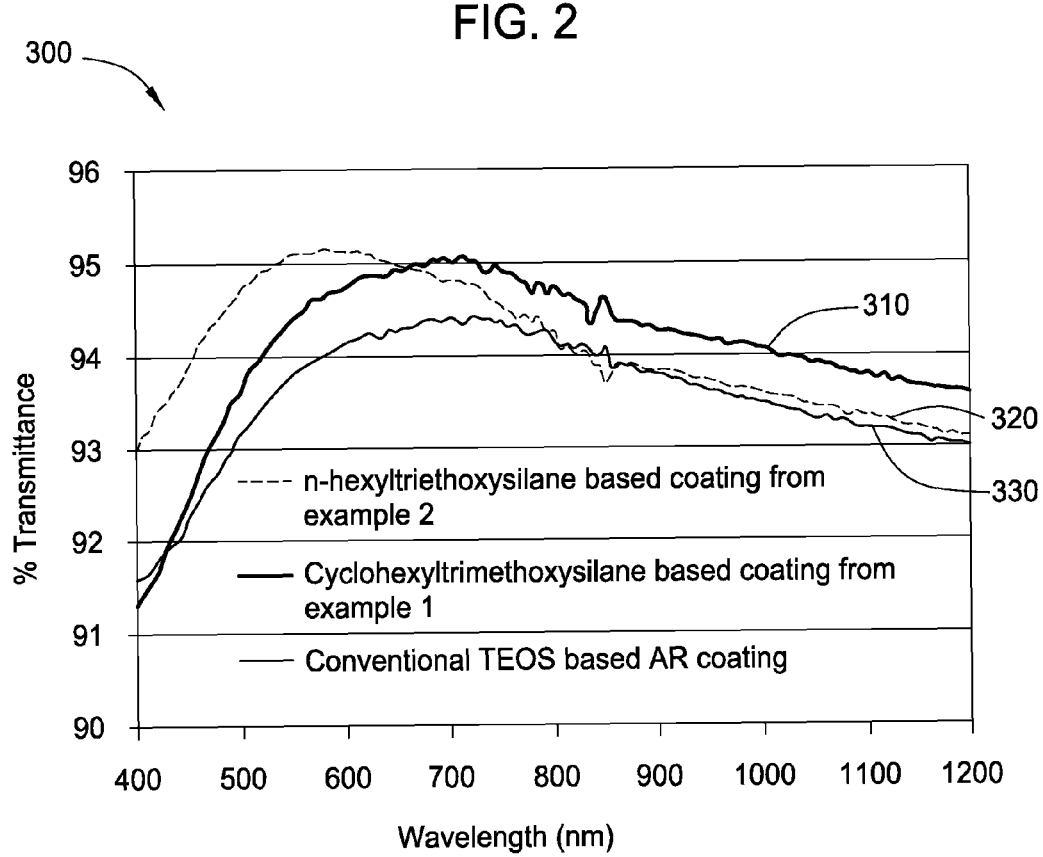
FIG. 3 is a plot depicting wavelength (nm) verses % transmittance for porous coatings.

FIG. 3 is a plot 300 depicting wavelength (nm) verses % transmittance for porous coatings. The y-axis represents % transmittance and the x-axis represents wavelength (nm). Curve 310 represents the % transmittance trend as a function of increasing wavelength for n-hexyltriethoxysilane based coating formed according to example #2 described above. Curve 320 represents the % transmittance trend as a function of increasing wavelength for a cyclohexyltrimethoxysilane based coating formed according to example #1 described above. Curve 330 represents the % transmittance trend as a function of increasing wavelength for a conventional TEOS based anti-reflective porous coating. Curves 310 and 320 demonstrate that further RI reduction is achievable due to combustion of the alkyl group in the alkyltrialkoxysilane-based binders described herein. With optimized thickness, under identical AR coating preparation conditions, examples 1 (curve 320) and 2 (curve 310) exhibit enhanced transmittance on textured glass (improved optical performance) compared to conventional TEOS based AR coating (curve 330) on the same textured glass.

Figure 4:
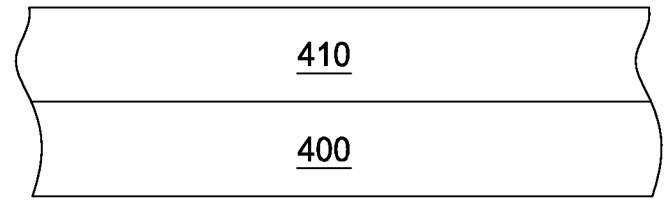
FIG. 4 is a schematic diagram illustrating one embodiment of a porous coating on a glass substrate according to embodiments described herein.

FIG. 4 is a schematic diagram illustrating one embodiment of a porous antireflective coating (ARC) 410 on a glass substrate 400 according to embodiments described herein. The porous antireflective coating 410 was produced using sol-gel compositions comprising the alkyltrialkoxysilane-based binder and silica based nanoparticles as described herein.

Figure 5:
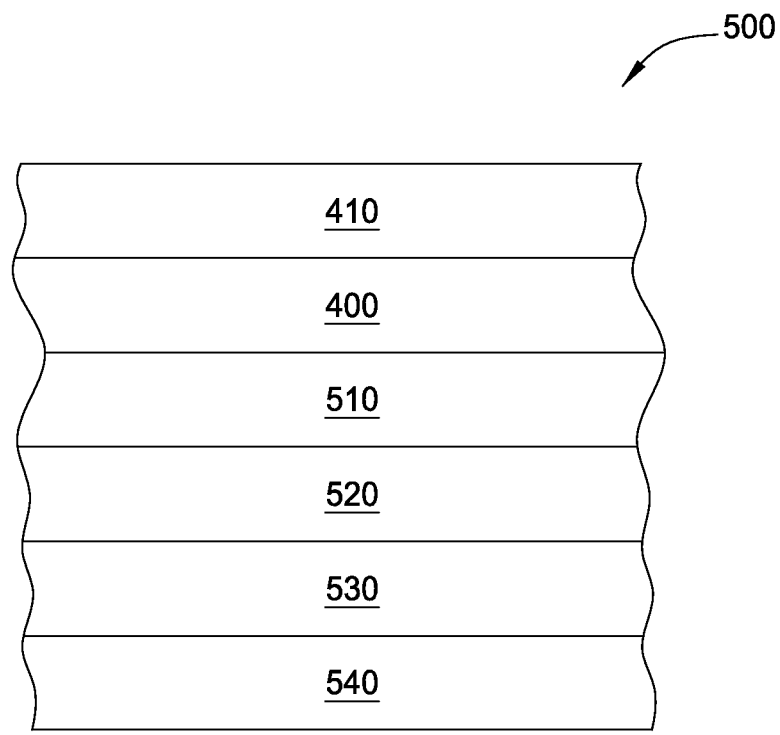
FIG. 5 is a schematic diagram illustrating one embodiment of a photovoltaic cell comprising a porous coating according to embodiments described herein.

FIG. 5 is a schematic diagram illustrating one embodiment of a photovoltaic cell 500 comprising a porous antireflective coating formed from the sol-gel composition comprising the alkyltrialkoxysilane-based binder and silica based nanoparticles as described herein. The photovoltaic cell 500 comprises the glass substrate 400 and the porous antireflective coating as shown in FIG. 4. In this exemplary embodiment, the incoming or incident light from the sun or the like is first incident on the AR coating 410, passes therethrough and then through the glass substrate 400 and front transparent conductive electrode 510 before reaching the photovoltaic semiconductor (active film) 520 of the solar cell. The photovoltaic cell 500 may also include, but does not require, a reflection enhancement oxide and/or EVA film 530, and/or a back metallic or otherwise conductive contact and/or reflector 540 as shown in FIG. 5. Other types of photovoltaic devices may of course be used, and the photovoltaic device 500 is merely exemplary. As explained above, the AR coating 410 may reduce reflections of the incident light and permits more light to reach the thin film semiconductor film 520 of the photovoltaic device 500 thereby permitting the device to act more efficiently.

While the foregoing is directed to embodiments of the invention, other and further embodiments of the invention may be devised without departing from the basic scope thereof.

What is claimed is:

1. A method of forming a porous coating on a substrate, comprising:

coating a substrate with a sol-formulation comprising:
an alkyltrialkoxysilane-based binder having the formula:

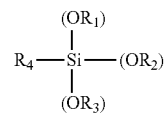

wherein at least one of R1, R2, and R3 represents an alkyl group containing 1 to 20 carbon atoms selected from the group consisting of n-pentyl, isopentyl, n-hexyl, isohexyl, cyclohexyl, n-heptyl, methoylcyclohexyl, octyl, and ethylcyclohexyl or an aryl group containing 6 to 20 carbon atoms selected from the group consisting of benzyl and xylyl;
wherein R4 represents a fluoro-modified alkyl group containing 1 to 20 carbon atoms; and
silica based nanoparticles, wherein a mass ratio of the alkyltrialkoxysilane-based binder to the silica based nanoparticles is between 0.1:1 to 20:1;
wherein the sol-formulation further comprises an alcohol containing solvent and an acid or base containing catalyst;
wherein the sol-formulation further comprises rare-earth-based oxide nanoparticles, the rare-earth-based oxide nanoparticles comprising at least one of $Y_2TeO_{11}$, $Y_2Te_5O_{13}$, $YInGe_2O_2$:$Eu^{3+}$, yttrium aluminum garnet (YAG) doped with $Eu^{3+}$ ions, $La_{(1-x)}Eu_x Mn_{0.9}Zn_{0.1}O_{3+d}$ (LEMZ), $Y_2O_3$:$Eu^{3+}$, or a combination thereof; and
annealing the coated substrate.

2. The method of claim 1, wherein the total ash content of the sol-formulation is from about 0.5 wt. % to 20 wt. % of the total weight of the sol-formulation.

3. The method of claim 2, wherein the alkyltrialkoxysilane-based binder comprises from about 10 wt. % to about 80 wt. % ash contribution in the total ash content of the sol-formulation.

4. The method of claim 1, wherein the fluoro-modified alkyl group containing 1 to 20 carbon atoms is fluorohexyl.

5. The method of claim 1, further comprising:
forming a gel on the substrate by drying the sol-formulation coated on the substrate prior to annealing the coated substrate.

6. The method of claim 1, wherein the silica based nanoparticles have a shape selected from the group consisting of spherical, elongated, disc-shaped, and combinations thereof.

7. The method of claim 6, wherein the silica based nanoparticles are selected from the group consisting of spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof.

8. The method of claim 1, wherein the alcohol containing solvent is n-propyl alcohol, and the acid or base containing catalyst is acetic acid.

9. The method of claim 1, wherein the alcohol containing solvent is n-propyl alcohol, and the acid or base containing catalyst is nitric acid.

10. The method of claim 1, wherein the sol-formulation further comprises an orthosilicate-based binder selected from the group consisting of tetraethylorthosilicate (TEOS), tetramethylorthosilicate (TMOS), tetrapropylorthosilicate, tetrabutylorthosilicate, tetrakis(trimethylsilyloxy)silane, tetrapropylorthosilicate (TPOS), propyltriethylorthosilicate (PTES), and combinations thereof.

11. The method of claim 1, wherein the sol-formulation comprises:
from about 0.1 wt. % to about 50 wt. % of alkyltrialkoxysilane-based binder;
from about 0.1 wt. % to about 15 wt. % of silica-based nanoparticles;
from about 50 wt. % to about 95 wt. % of an alcohol containing solvent; and
from about 0.001 wt. % to about 0.1 wt. % of an acid or base containing catalyst.

12. A method of forming a porous coating on a substrate, comprising:
coating a substrate with a sol-formulation comprising:
an alkyltrialkoxysilane-based binder selected from the group consisting of n-pentyltriethoxysilane, n-hexyltriethoxysilane, and combinations thereof; and
silica based nanoparticles, wherein a mass ratio of the alkyltrialkoxysilane-based binder to the silica based nanoparticles is between 0.1:1 to 20:1; and
wherein the sol-formulation further comprises:
an alcohol containing solvent;
an acid or base containing catalyst; and
rare-earth-based oxide nanoparticles, the rare-earth-based oxide nanoparticles comprising at least one of $Y_2TeO_{11}$, $Y_2TeO_{13}$, $YInGe_2O_7:Eu^{3+}$, yttrium aluminum garnet (YAG) doped with $Eu^{3+}$ ions, $La_{(1-x)}Eu_xMn_{0.9}Zn_{0.1}O_{3+d}$ (LEMZ), $Y_2O_3$:Eu3+, or a combination thereof;
annealing the coated substrate.

13. The method of claim 12, further comprising:
forming a gel on the substrate by drying the sol-formulation coated on the substrate prior to annealing the coated substrate.

14. The method of claim 12, wherein the silica based nanoparticles have a shape selected from the group consisting of spherical, elongated, disc-shaped, and combinations thereof.

15. The method of claim 14, wherein the silica based nanoparticles are selected from the group consisting of spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof.

* * * * *